United States Patent [19]

Yoshida et al.

[11] 4,363,285

[45] Dec. 14, 1982

[54] DEVICE FOR COATING GRANULAR SOLIDS

[75] Inventors: Kazuyuki Yoshida, Fujieda; Shizuo Kaneko; Mikio Okawara, both of Shizuoka; Terushige Hiroki, Shimada, all of Japan

[73] Assignees: Ohkawara Mfg. Co., Ltd., Tokyo; Daiichi Seiyaku Company, Limited, Shizuoka, both of Japan

[21] Appl. No.: 179,668

[22] Filed: Aug. 19, 1980

[30] Foreign Application Priority Data

Sep. 6, 1979 [JP] Japan ................. 54-114848

[51] Int. Cl.³ .......................................... B05C 5/00
[52] U.S. Cl. ................................. 118/19; 118/20; 118/24; 118/303
[58] Field of Search .............. 118/20, 19, 24, 303; 427/2, 3, 242

[56] References Cited

U.S. PATENT DOCUMENTS

| | | | |
|---|---|---|---|
| 3,167,035 | 1/1965 | Benson | 118/19 X |
| 3,834,347 | 9/1974 | Motoyama et al. | 118/19 |
| 4,050,406 | 9/1977 | Reni | 118/19 |
| 4,245,580 | 1/1981 | Okawara | 118/20 X |

FOREIGN PATENT DOCUMENTS

| | | |
|---|---|---|
| 2212985 | 9/1973 | Fed. Rep. of Germany ........ 118/19 |
| 2445102 | 4/1976 | Fed. Rep. of Germany ........ 118/20 |
| 2805801 | 8/1979 | Fed. Rep. of Germany ........ 118/19 |
| 49-22702 | of 1974 | Japan . |
| 50-38713 | of 1975 | Japan . |
| 51-18397 | of 1976 | Japan . |

*Primary Examiner*—John D. Smith
*Assistant Examiner*—Bernard F. Plantz
*Attorney, Agent, or Firm*—Armstrong, Nikaido, Marmelstein & Kubovcik

[57] ABSTRACT

In a rotary drum type device for coating granular solids of the type having a rotary drum with a perforated cylindrical wall section, a supporting ring surrounding the cylindrical wall section of the drum for rotatably supporting the same, and inlet and outlet duct means defined within the supporting ring and opening to the perforated cylindrical wall section of the drum in such a way that the hot air or the like is directed from the top of the drum toward a tumbling bed of granular solids formed within the drum, the perforated cylindrical wall section is so divided that the area which faces the opening of the inlet duct means will not face the opening of the outlet duct means and vice versa, whereby the coating agent which is deposited on the walls of the small holes of the cylindrical wall section facing the opening or inlet of the outlet duct means can be prevented from being separated and falling into the drum by the hot air or the like flowing through the opening of the inlet duct means into the drum.

3 Claims, 4 Drawing Figures

DEVICE FOR COATING GRANULAR SOLIDS

BACKGROUND OF THE INVENTION

1. Field of the Invention

The present invention relates to a rotary drum type device for coating granular solids such as tablets, catalyst-carrying particles or the like.

2. Brief Description of the Prior Art

There have been devised and demonstrated various types of devices for coating granular solids. One is of the rotary drum type having a rotary drum consisting of a cylindrical section and side walls, the wall of the cylindrical section being perforated. One side wall has an inlet-outlet opening for feeding granular solids into the rotary drum, and the other side wall is connected to a rotary shaft which in turn is drivingly connected to an electric motor. An annular duct surrounds the perforated cylindrical section of the drum and is divided with partition walls into an upper inlet duct and a lower outlet duct. An inlet pipe and an outlet pipe or exhaust pipe are communicated with the annular duct in diametrically opposed relationship so that the hot air or the like flows from the inlet pipe through the inlet duct, the openings in the cylindrical section of the drum, the drum, the openings in the cylindrical section, the outlet duct and the outlet or exhaust pipe. As the rotary drum is rotated, a tumbling bed of granular solids is formed and sprayed with a coating liquid containing a coating agent. The coating liquid applied to the surfaces of the granular solids is dried by the hot air flowing as described above.

In the coating device of the type described, some coating liquid particles pass through the tumbling bed and are deposited on the walls of small holes in the cylindrical section of the drum and over the areas in the vicinity of the small holes. Since the hot air passes through these small holes, the coating liquid is dried, leaving layers or scales of the coating agent. As the drum is rotated, these small holes face the inlet duct so that the hot air flows into the drum through these holes and consequently the deposited layers or scales of the coating agent are separated and fall into the drum. As a result, the coated granular solids are contaminated with the separated coating agent.

In order to overcome this problem, there have been proposed various devices as disclosed in Japanese Patent Publication Nos. 49-22702, 50-38713 and 51-18397. In these devices, while the hot air is discharged through the wall of the rotary drum, it is directly fed into the drum substantially at the center thereof through an opening of one side wall of the drum, unlike the first-mentioned device in which the hot air is charged through the small holes in the wall of the cylindrical section of the drum.

In the process for coating granular solids with the coating device, it is essential that the granular solids be effectively applied with a coating liquid which is sprayed. To this end, the hot air must be used not only for drying the granular solids but also for carrying and directing sprayed coating liquid mists from the top of the drum toward the tumbling bed of granular solids, whereby the coating efficiency can be remarkably improved. However, with the prior art coating devices of the types described, such a hot air stream as described above cannot be obtained, but the hot air flows in random directions so that the sprayed coating liquid mists are spread in all directions in the drum and adhere to the whole inner wall surface of the drum, resulting in scaling.

SUMMARY OF THE INVENTION

In view of the above, the primary object of the present invention is to provide a rotary drum type device for coating granular solids which can prevent the separation of the scales of the coating agent which are deposited in and in the vicinity of small holes in the cylindrical wall of the rotary drum, whereby the contamination of processed or coated granular solids with separated scales can be avoided.

Briefly stated, to the above and other ends, the present invention provides a rotary drum type device for coating granular solids comprising a drum with a perforated cylindrical section, a supporting ring surrounding said perforated cylindrical section for rotatably supporting said drum, inlet duct means and outlet duct means defined within said supporting ring and opening to or facing said perforated cylindrical section of said drum in such a way that gas is directed from the top of said drum toward a tumbling bed of granular solids formed in said drum, an inlet pipe connected to said inlet duct means, an outlet or exhaust pipe connected to said outlet duct means, a prime mover for rotating said drum, a spray means disposed within said drum for spraying a coating liquid, and said perforated cylindrical section of said drum being so divided that the area which faces the opening of said inlet duct means will not face the opening of said outlet duct means and vice versa.

DESCRIPTION OF THE PREFERRED EMBODIMENT

Figure 1:
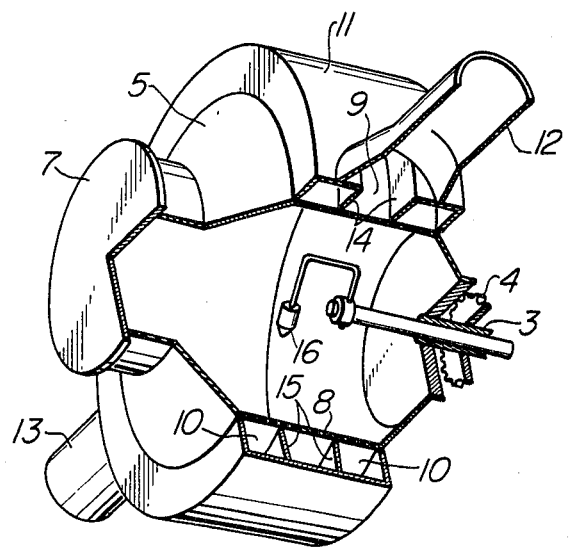
FIG. 1 is a perspective view, partly broken, of a preferred embodiment of the present invention.
Figure 2:
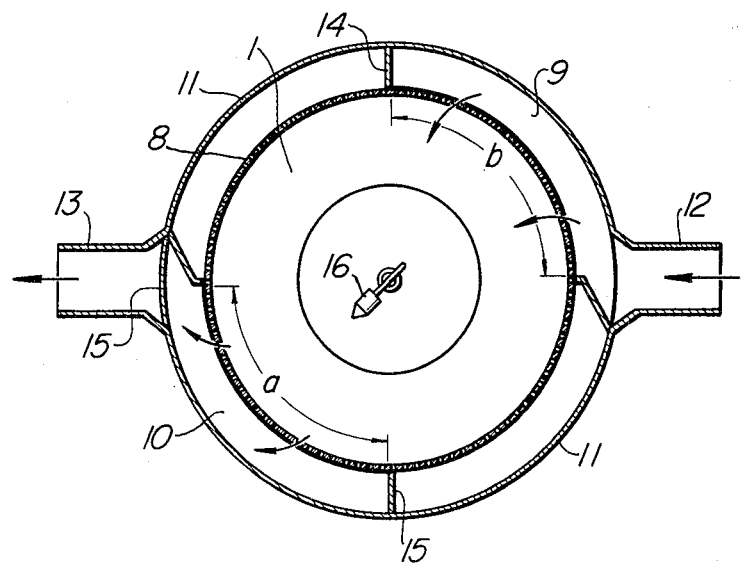
FIG. 2 is a front view in section thereof.

A preferred embodiment of the present invention will be described which is directed to a device for coating tablets. A coating device is shown in perspective in FIG. 1 for the sake of better understanding of the overall construction, but the detailed description will be made with particular reference to FIGS. 2 and 3. Tablets are coated in a double-cone rotary drum 1 with a plurality of buffles (not shown). As the rotary drum 1 is rotated in the clockwise direction, the tablets are agitated by the buffles and sprayed with a coating liquid containing a coating agent. Thereafter the tablets applied with the coating liquid are dried to evaporate a solvent in the coating liquid and then discharged.

The cylindrical section or wall 8 of the rotary drum 1 is made of air-permeable plates; that is, perforated plates such as punching metal, so that the hot air can be blown through the small holes into the cylindrical section 8.

A rotary shaft 3 which is mounted at the center of one side plate 2 carries a gear or pulley 4 which in turn is drivingly coupled to an electric motor (not shown), whereby the rotary drum 1 is driven in the clockwise direction as described above.

A tablet inlet-outlet 6 with a door 7 is attached to the other side plate 5 so that the tablets may be fed into or discharged out of the rotary drum 1. The rotary drum 1 is rotatably supported by a supporting ring 11 which surrounds the cylindrical section 8. According to the present invention, the supporting ring 11 is in the form of a duct and is communicated with a hot air feed pipe 12 and an exhaust pipe 13. Axially-spaced partition walls 14 are extended substantially one quarter b (see FIG. 2) of the supporting ring 11 in such a way that a radially-inwardly-opened hot air inlet duct 9 may be defined and communicated with the inlet pipe 12. Conventional sealing means (not shown) are disposed between the inner ends of the partition walls 14 and the cylindrical section 8 of the rotary drum 1. In like manner, substantially in diametrically opposed relationship with the inlet duct 9, radially-inwardly-opened outlet ducts 10 are defined by partition walls 15 along the arc a shown in FIG. 2. These outlet ducts 10 are communicated with the outlet pipe 13. Conventional sealing means are interposed between the inner ends of the partition walls 15 and the cylindrical section 8 of the rotary drum 1. In this embodiment, the area of the openings of the outlet ducts 10 is approximately twice as large as that of the opening of the inlet duct 9 which is in diametrically opposed relationship with the former, but it is to be understood that the present invention is not limited to the above area ratio and that the area ratio can be changed arbitrarily depending upon a selected flow rate of the hot air, the capacity of an exhaust fan or the like connected to the outlet pipe 13 and other operating conditions. However, it is important that the radially-inward openings of the inlet and outlet ducts 9 and 10 are not circumferentially in line with each other or must be offset.

A coating liquid is sprayed through a spray nozzle 16. Next the mode of operation of the coating device with the above construction will be described. A batch of tablets is charged into the rotary drum 1 and the latter is rotated in the clockwise direction so that the tablets are tumbled and agitated by the buffles. As a consequence, the assemblage of tablets assumes a lunar shape over the arc a shown in FIG. 2. In other words, a tumbling bed is formed. The hot air is fed through the inlet pipe 12, the inlet duct 9 and the perforated cylindrical wall 8 of the rotary drum 1 while a coating liquid is sprayed through the spray nozzle 16 over the tumbling bed. Since the rotary drum 1 is rotating, the hot air flows from b to a, i.e., the tumbling bed and dries the tablets. The hot air is discharged through the perforated cylindrical wall 8, the outlet ducts 10 and the outlet or exhaust pipe 13.

Figure 3:
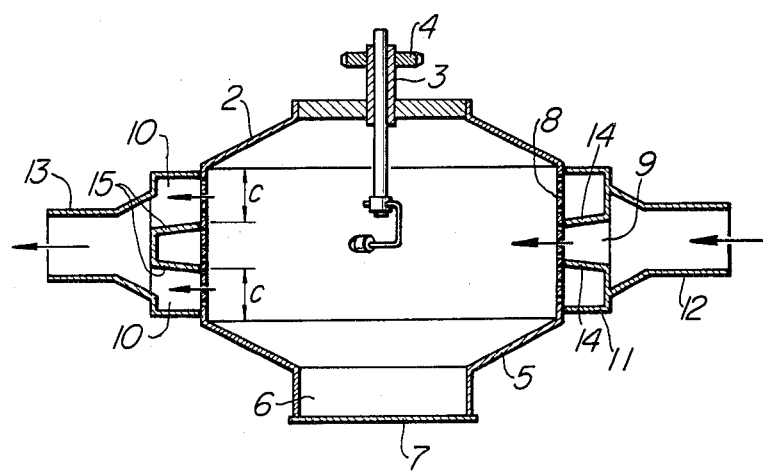
FIG. 3 is a top view in section thereof.
Figure 4:
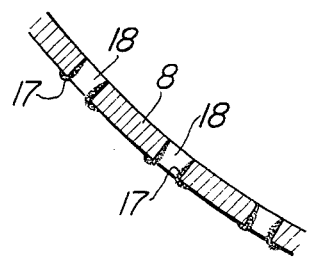
FIG. 4 is a view used for the explanation of deposition and growth of scales of the coating agent.

Part of the sprayed coating liquid passes through the tumbling bed and the small holes 18 (see FIG. 4) of the cylindrical wall 8 in opposed relationship with the inlets to the outlet ducts 10 as indicated at c in FIG. 3. Coating liquid mists, therefore, adhere to the walls of the above small holes 18 and are dried by the hot air streams passing therethrough. As a result, the coating agent 17 is deposited and grows over the walls of the small holes 18 and the regions of the outer surface of the cylindrical wall 8 close to the outlets of the small holes 18 as shown in FIG. 4. However, these holes with the accumulated scales of the coating agent will not pass past the radially-inward opening or outlet of the inlet duct 9 over the arc b. Therefore the hot air will not pass through these holes 18 with accumulated scales of the coating agent and subsequently no separation of the deposited scales of the coating agent by the hot air flowing into the drum 1 will occur. As a result, the contamination of the tablets with the separated scales can be completely prevented.

What we claim is:

1. A rotary drum type device for coating granular solids comprising
   a drum with a perforated cylindrical section,
   a supporting ring surrounding said perforated cylindrical section for rotatably supporting said drum,
   inlet duct means and outlet duct means defined in said supporting ring and being open to said perforated cylindrical section of said drum in such a way that gas is directed from the top of said drum toward a tumbling bed of granular solids formed in said drum and exhausted from the bottom of said drum through said tumbling bed of granular solids formed in said drum, said inlet duct means and said outlet duct means being diametrically opposed,
   an inlet pipe connected to said inlet duct means,
   a prime mover for rotating said drum,
   spray means disposed within said drum for spraying a coating liquid,
   said perforated cylindrical section of said drum being divided into a first area which is only in communication with the opening of said inlet duct means and a second area which is only in communication with the opening of said outlet duct means, such that different areas of said perforated cylindrical section operate in conjunction with said inlet means and said outlet means of the supporting ring, respectively.

2. A rotary drum type device for coating granular solids as set forth in claim 1, wherein the cross-sectional area of the opening of outlet means which faces the perforated cylinder is approximately twice the cross-sectional area of the opening of the inlet means which faces the perforated cylinder.

3. A rotary drum type device for coating granular solids as set forth in claim 1, wherein said supporting ring is in the form of a duct and said perforated cylinder and said supporting ring are separated by a sealing means.

* * * * *